Patented Apr. 30, 1940

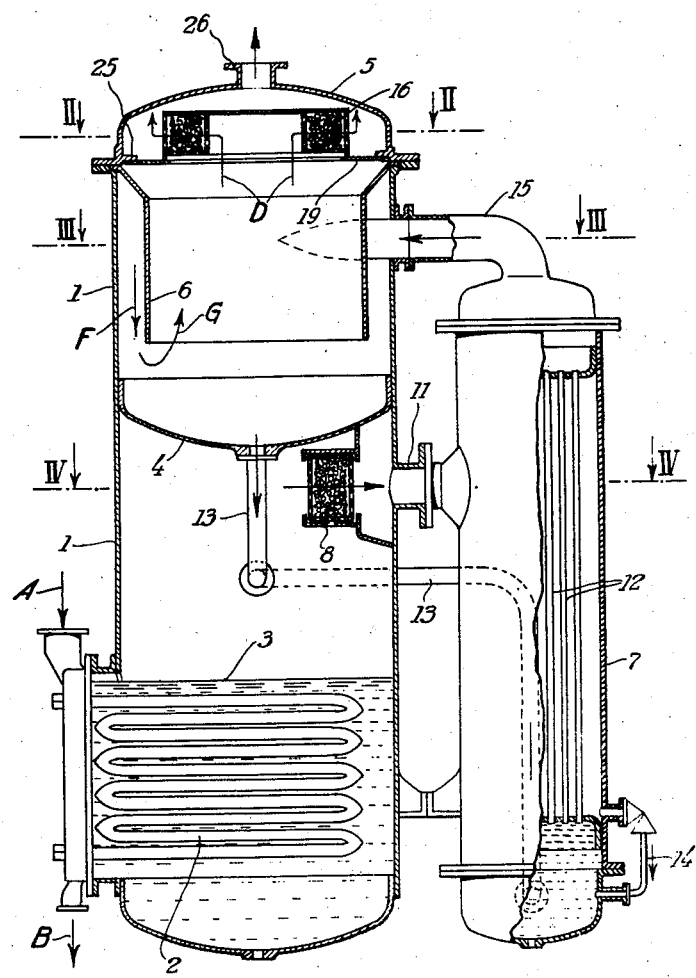

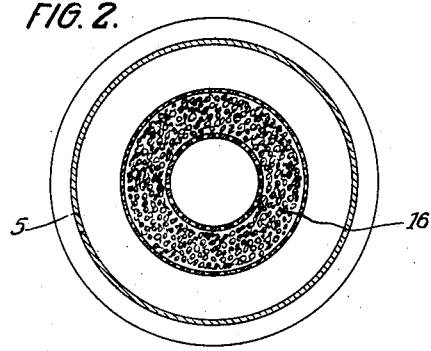
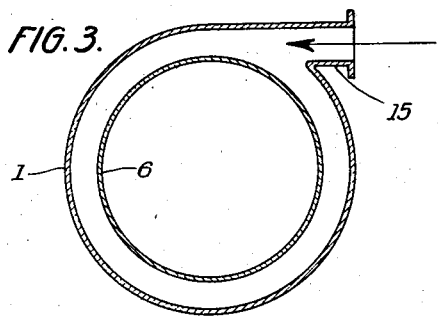
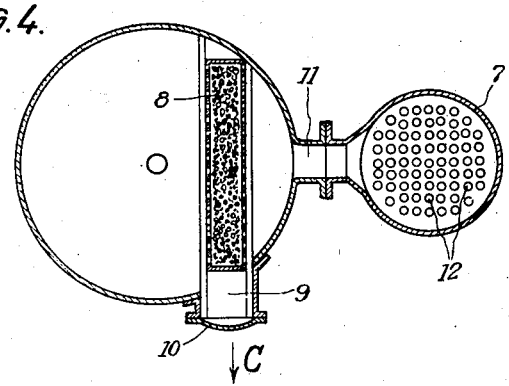

2,199,320

UNITED STATES PATENT OFFICE 2,199,320

EVAPORATOR FOR PRODUCTION OF HIGH-GRADE DISTILLATE

Sergius von Le Juge, Bremen, Germany

Application July 31, 1937, Serial No. 156,785
In Germany September 30, 1936

4 Claims. (Cl. 202—155)

This invention relates to an evaporator for producing high-grade distillate, especially from very impure liquid, for example sea water. The improved evaporator accordingly comprises a primary evaporator and a secondary evaporator for repeated circulation and the invention involves the provision of filters in the path of the vapour products.

The invention in one aspect consists in arranging these filters in such a way that they are particularly effective, but nevertheless are adapted to be relatively easily dismantled from the evaporating plant as a whole, for example for the purpose of being cleaned, and reinserted in the evaporator part.

Figure 5:
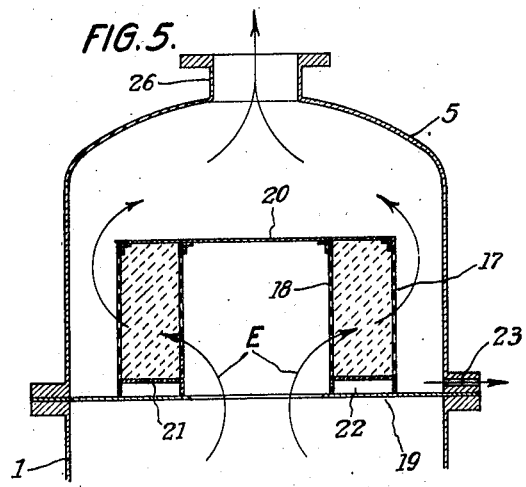
Figure 6:
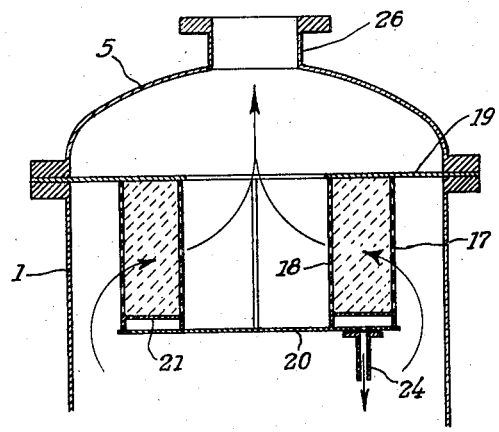

The invention is illustrated by way of example in the accompanying drawings in which Fig. 1 is a longitudinal section and partial elevation of one form of evaporator according to the invention, Fig. 2 is a cross section through the evaporator on the line II—II in Fig. 1, Fig. 3 is a cross section through the evaporator on the line III—III of Fig. 1, Fig. 4 is a cross section on the line IV—IV of Fig. 1, Fig. 5 is a vertical section through the upper part of a somewhat modified constructional example of evaporator, shown to a larger scale, and Fig. 6 is a similar longitudinal section of another constructional example.

In the drawings, 1 indicates the body of a primary evaporator, 2 a system of heating tubes in which the steam enters in the direction of the arrow A and the condensate can discharge in the direction of the arrow B. The normal surface level of the liquid to be evaporated is indicated at 3. With the object of simplifying the drawings, the inlet duct for the liquid to be evaporated and the regulating means associated therewith are not shown. A separating chamber is arranged above the primary evaporator and its base and cap are denoted respectively by 4 and 5. Any desired means adapted to separate liquid from vapour may be provided in this separating chamber; in the constructional example shown these means consist of a cylindrical separating body 6 which compels the mixture of vapour and water entering the separating chamber to flow downwards before the vapour is able to flow upwards again preparatory to leaving the separating chamber.

Numeral 7 denotes the heater of a secondary evaporator which is connected on its vapour side through a filter 8 to the vapour space of the primary evaporator. In a particularly convenient constructional form there is provided in the body 1 of the primary evaporator an opening 9 which is closed by an easily detachable cover 10. Thus the filter 8 is adapted at any time to be removed from the evaporator in the direction of the arrow C for the purpose of being cleaned. The connecting duct through which the wet vapour flows from the primary evaporator into the secondary evaporator for the purpose of heating the latter is denoted by 11. This vapour flows over a system of tubes 12 and thereby evaporates the liquid contained therein. The secondary evaporator is supplied with primary distillate from the heater 7 by a duct 14. The liquid for recirculation separated in the separating chamber returns to the secondary evaporator through a duct 13.

The mixture of vapour and liquid from the secondary evaporator passes through a duct 15 into the separating chamber. In the upper portion of this separating chamber is disposed a second filter 16 which is formed as a ring-shaped filter and is so arranged that the vapour is compelled to pass through the ring shaped filter in a substantially horizontal direction, as is shown by the arrows D and E in Figs. 1 and 6. Such a ring-shaped filter may comprise perforated annular side walls 17 and 18, a supporting plate 19 and a cover plate 20. The space between the side walls 17 and 18 is charged with any desired filling material. It is convenient to provide, by means of an auxiliary base 21, a chamber 22 under the ring-shaped filter, in which the liquid separated by the filter can collect without adversely influencing the operation of the filter. This liquid may be led away through an appropriate opening 23 or a pipe 24. The supporting plate 19 can be arranged to render the ring-shaped filter easily detachable from the evaporator by either a screwed connection between this supporting plate and a flange 25 of the cap 5, as is evident from Fig. 1, or by inserting this supporting plate between the cap 5 and the body of the evaporator, as is seen in Figs. 5 and 6. In accordance with the space conditions available the ring-shaped filter may either stand upright on the supporting plate 19 (Fig. 5) or depend therefrom (Fig. 6).

The mode of operation of the evaporator is as follows:

The very impure liquid contained in the primary evaporator is evaporated by a heating tube system 2; the resulting wet vapour is forced to flow through the filter 8 and thence passes through the connection 11 into the secondary evaporator. The liquid heated in the tube system 12 of the secondary evaporator passes in the form of a mixture of vapour and liquid through the duct 15 into the separating chamber, preferably in a tangential direction as is shown in Fig. 3. The mixture of vapour and liquid then flows downwards in the direction of the arrow F in order thereafter the rise following the separation of the liquid from the vapour, and after passage through the filter 16 to leave the evaporator through the pipe flange 26. This vapour is condensed in a condenser not shown and yields a particularly high-grade distillate.

What I claim is:

1. An evaporator for producing a high-grade distillate from very impure water, comprising a primary evaporator, heating elements therein, a filter for the wet vapor generated in the primary evaporator, a secondary evaporator communicating on its vapor side with said filter and heated by the primary wet vapor coming from the said filter, a duct for supplying the distillate of the primary wet vapor for reevaporation in the water chamber of the secondary evaporator, a separating chamber for the secondary wet vapor, means for separating vapor and water in said separating chamber, a filter for the vapor drawn from the said separating chamber and a down pipe conducting the water from the said separating chamber into the said secondary evaporator for recirculation.

2. An evaporator for producing a high-grade distillate from very impure water, comprising a primary evaporator, heating elements therein, a withdrawable box-filter for the wet vapor generated in the primary evaporator, a secondary evaporator communicating on its vapor side with said filter and heated by the primary wet vapor coming from the said filter, a duct for supplying the distillate of the primary wet vapor for reevaporation in the water chamber of the secondary evaporator, a separating chamber for the secondary wet vapor mounted on said primary evaporator, a duct for conducting vapor between said secondary evaporator and said separating chamber, means for separating vapor and water in said separating chamber, a ring-shaped filter for the vapor drawn from the said separating chamber, a plate supporting said ring-shaped filter and inserted between said separating chamber and its cap, and a down pipe conducting the water from the said separating chamber into the said secondary evaporator for recirculation.

3. An evaporator for producing a high-grade distillate from very impure water, comprising a primary evaporator, heating elements therein, a withdrawable box-filter for the wet vapor generated in the primary evaporator, a secondary evaporator communicating on its vapor side with said filter and heated by the primary wet vapor coming from the said filter, a duct for supplying the distillate of the primary wet vapor for reevaporation on the water chamber of the secondary evaporator, a separating chamber for the secondary wet vapor mounted on the primary evaporator, a duct for conducting vapor between said secondary evaporator and said separating chamber means for separating vapor and water in the said separating chamber, a ring-shaped filter for the vapor drawn from the separating chamber, a plate supporting the ring-shaped filter and inserted between said separating chamber and its cap, a cylindrical separating element under the ring-shaped filter and a down pipe conducting the water from the said separating chamber into the secondary evaporator for recirculation.

4. An evaporator for producing a high-grade distillate from very impure water, comprising a primary evaporator, heating elements therein, a withdrawable box-filter for the wet vapor generated in the primary evaporator, a secondary evaporator communicating on its vapor side with said filter and heated by the primary wet vapor coming from the said filter, a duct for supplying the distillate of the primary wet vapor for reevaporation in the water chamber of the secondary evaporator, a separating chamber for the secondary wet vapor mounted on the primary evaporator, a duct for conducting vapor between the secondary evaporator and said separating chamber, means for separating vapor and water in the said separating chamber, a ring-shaped filter for the vapor drawn from the separating chamber, a plate supporting the ring-shaped filter and inserted between said separating chamber and its cap, a cylindrical separating element under the ring-shaped filter, a flange on the upper end of the cylindrical separating element inserted between said separating chamber and its cap and a down pipe conducting the water from the said separating chamber into the secondary evaporator for recirculation.

SERGIUS von LE JUGE.